(12) United States Patent
Babington (10) Patent No.: US 12,007,591 B2
(45) Date of Patent: Jun. 11, 2024

(54) DIGITAL IMAGE OVERLAY IN IMAGE INTENSIFIED AND TELESCOPIC SYSTEM

(71) Applicant: Qioptiq Limited, St. Asaph (GB)

(72) Inventor: James Babington, Prestatyn (GB)

(73) Assignee: Qioptiq Limited, Denbighshire (GB)

( * ) Notice: Subject to any disclaimer, the term of this patent is extended or adjusted under 35 U.S.C. 154(b) by 250 days.

(21) Appl. No.: 17/386,757

(22) Filed: Jul. 28, 2021

(65) Prior Publication Data

US 2021/0356635 A1   Nov. 18, 2021

Related U.S. Application Data

(63) Continuation of application No. 16/402,286, filed on May 3, 2019, now Pat. No. 11,112,545.

(30) Foreign Application Priority Data

May 3, 2018   (EP) .................................... 18170704

(51) Int. Cl.
*G02B 5/18*   (2006.01)
(52) U.S. Cl.
CPC ......... *G02B 5/1842* (2013.01); *G02B 5/1828* (2013.01); *G02B 5/1847* (2013.01); *G02B 5/1861* (2013.01)
(58) Field of Classification Search
CPC .. G02B 5/1842; G02B 5/1828; G02B 5/1847; G02B 5/1861; G02B 27/0172
See application file for complete search history.

(56) References Cited

U.S. PATENT DOCUMENTS

| | | | |
|---|---|---|---|
| 5,886,822 A | 3/1999 | Spitzer | |
| 6,560,029 B1 * | 5/2003 | Dobbie | G02B 23/125 2/6.1 |
| 9,615,067 B1 * | 4/2017 | Foote | H04N 7/185 |
| 9,684,170 B2 | 6/2017 | Simmonds | |
| 10,642,038 B1 * | 5/2020 | Schuyler | G02B 23/125 |

(Continued)

FOREIGN PATENT DOCUMENTS

| | | |
|---|---|---|
| EP | 3037867 | 6/2016 |
| GB | 2472516 | 2/2011 |
| GB | 2524068 | 9/2015 |

OTHER PUBLICATIONS

Communication pursuant to Article 94(3) EPC dated Jul. 7, 2022 in connection with European Application No. 18170704.3.

(Continued)

*Primary Examiner* — Robert E. Tallman
(74) *Attorney, Agent, or Firm* — Wolf, Greenfield & Sacks, P.C.

(57) ABSTRACT

An optical system for overlaying a first image of a scene and a second image includes an image intensified night vision and/or telescopic device providing the first image, a second imaging device with an image display and collimation optics providing the second image, and a waveguide. The waveguide has a first diffraction grating configured to receive the first image, a second diffraction grating configured to receive the second image, and a guide portion disposed between the first diffraction grating and the second diffraction grating configured to convey the second image to the first grating. The first diffraction grating is configured to overlay the first image and the second image.

11 Claims, 5 Drawing Sheets

(56) References Cited

U.S. PATENT DOCUMENTS

| | | |
|---|---|---|
| 11,112,545 B2 | 9/2021 | Babington |
| 2016/0018658 A1* | 1/2016 | Machida .............. G09G 3/3406 345/207 |
| 2019/0339430 A1 | 11/2019 | Babington |

OTHER PUBLICATIONS

Extended European Search Report for EP18170704.3, dated Nov. 16, 2018.

* cited by examiner

DIGITAL IMAGE OVERLAY IN IMAGE INTENSIFIED AND TELESCOPIC SYSTEM

CROSS-REFERENCE TO RELATED APPLICATIONS

This application is a continuation of and claims the benefit of U.S. patent application Ser. No. 16/402,286, filed May 3, 2019, entitled "Digital Image Overlay in Image Intensified and Day Sight System," which claims priority to European Patent Application serial number 18170704.3, filed May 3, 2018, entitled "Digital Image Overlay in Image Intensified and Day Sight System," both of which are incorporated by reference herein in their entirety.

FIELD OF THE INVENTION

The present invention relates to an optical device, and more particularly, is related to enhanced analogue vision devices.

BACKGROUND OF THE INVENTION

Specialized analogue optical devices such as night vision (image intensifying ($I^2$)) goggles and telescopic sights, together with thermal cameras and digital displays provide images and information to a viewer that is both separate and distinct. However, the images produced by such devices contain complimentary information that, in the context of a scene, may be difficult for the viewer to assimilate when viewed as separate channels. Previous devices have combined such images with another specialized image or a visible light image by the design of bespoke but standard optics to perform image injection. However, the images provided by these devices have either made it difficult for the viewer to discriminate between the two images, or have required bespoke optics in situ to accomplish this. In particular, the combined images may be limited to a narrow color range, making the combined images difficult for the viewer to differentiate the two images. Furthermore, such solutions have not been adaptable to retrofit to existing specialized optical devices in the form of a simple clip on type devices.

As an example of a limitation of existing technology, consider the system outlined in GB 2472516. In this type of system, a digital image from a thermal camera is injected via a collimation optic into an I' objective optic. This has the effect that the digital thermal image necessarily must be the same color as that of F phosphor. Thus, both the F image and the digital thermal image do not have good contrast and may not be differentiated by their respective colors. As a second example, overlaying a thermal or symbology digital image onto an existing telescopic sight (day sight) requires either a similar image injection into the day sight, thus causing a partial obscuration of the front aperture, or considerable redesign and engineering of the eyepiece optic. Therefore, there is a need in the industry to address one or more of these issues.

SUMMARY OF THE INVENTION

Embodiments of the present invention provide a digital image overlay in an image intensified and/or telescopic sight (day sight) system. Briefly described, the present invention is directed to an optical system for overlaying a first image of a scene and a second image. The system includes an image intensified night vision and/or telescopic device providing the first image, a second imaging device with an image display and collimation optics providing the second image, and a waveguide. The waveguide has a first diffraction grating configured to receive the first image, a second diffraction grating configured to receive the second image, and a guide portion disposed between the first diffraction grating and the second diffraction grating configured to convey the second image to the first grating. The first diffraction grating is configured to overlay the first image and the second image.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

As used within this description, "substantially" means "very nearly," or within typical manufacturing tolerances.

Figure 1:
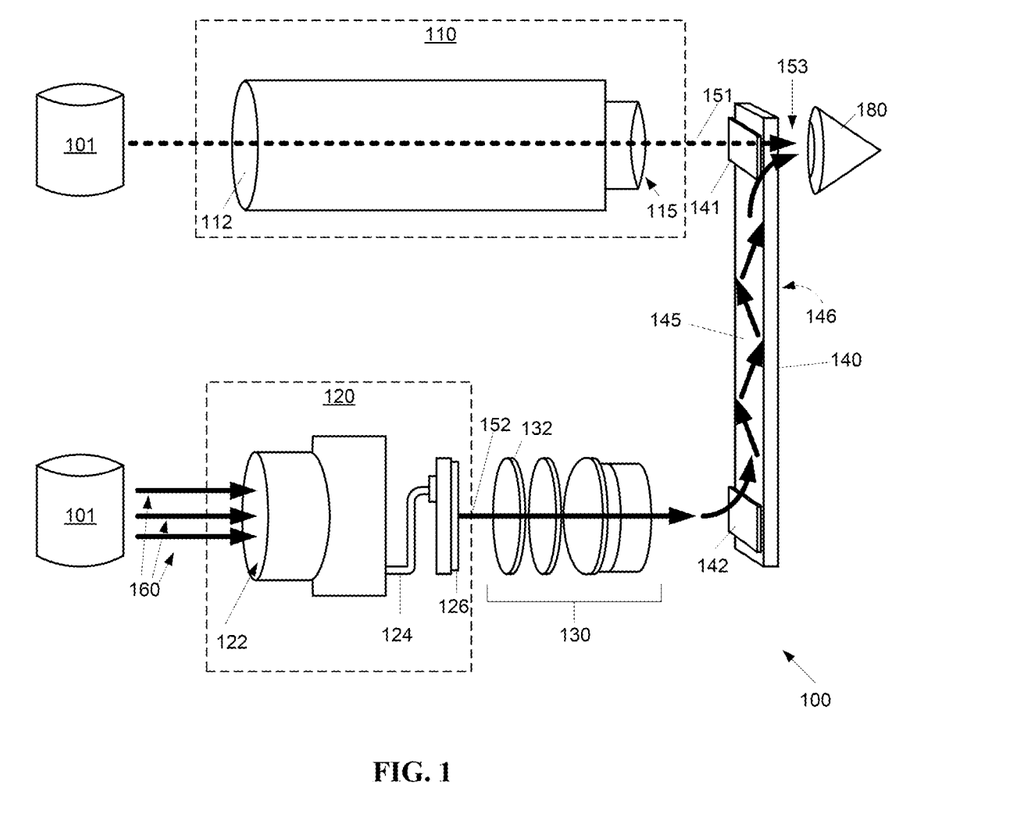
FIG. 1 is a schematic diagram of a first embodiment of an optical system according to the present invention.

FIG. 1 shows an exemplary first embodiment of the present invention directed to a system 100 for overlaying a digital image 152 of a scene 101 with an image 151 produced by an optical device 110, for example, an analogue optical device. For example, the first analogue optical device 110 may include image intensified ($I^2$) night vision optics, or telescopic sight (day vision) optics. The overlaid digital image 152 preferentially may be a digital thermal image, but may be another image, for example, another waveband image or symbology.

Under the first embodiment 100 the first optical device 110 may be, for example, an $I^2$ night vision device that produces a first image 151 of a scene 101. For example, the first optical device 110 may receive light from the scene 101 at an objective lens 112, and produce the first image 151 for viewing at an eyepiece 115. The first image 151 may then pass through the waveguide 145 and diffraction grating 141 unaltered. The diffraction grating 141 may be designed in such a way as to allow transmitting the first image 151 with only small transmission losses where the light is put into other diffraction orders. The first image 151 may be viewable through a waveguide 140, for example, a slab waveguide 140 by a viewer 180, for example, at a second planar surface 146 of the waveguide opposite the first planar surface 145, behind the first diffraction grating 141.

The second optical device 120 may be, for example, a thermal imaging device that produces a second image 152 of the scene 101. For example, the second optical device 120 may receive long wave infrared radiation 160 from the scene 101 at an objective lens 122, and produce the second image 152 of the scene 101, for example, a digital image via an electrical connection 124 for viewing at a display 126. The display 126 may be a micro OLED display to reduce overall system size, preferably configured to provide a full range of colors in the visible spectrum, or, alternatively, may be configured to provide colors that contrast the color spectrum of the first image 151, which may be, for example a green phosphor typical of an image intensified channel. For example, if the color content of the first image 151 is predominantly in the green and/or yellow range, the display 126 may be configured to present images in the visible as red, green, and blue or combinations thereof (for example to produce grayscale images).

At the display 126, the second image 152 may be collimated, for example, by a collimator 130 for introduction into the waveguide 140 through a second diffraction grating 142 on a first planar surface 145 of the waveguide 140. The first diffraction grating 141 and the second diffraction grating 142 may be coupled via the waveguide 140 such that the second image 152 may be conveyed via total internal reflection in the waveguide 140 to be viewable through the waveguide 140 by the viewer 180, for example, at the second planar surface 146 of the waveguide opposite the first planar surface 145, behind the first diffraction grating 141, such that the second image 152 overlays the first image 151 from the perspective of the viewer 180 to form a combined image 153, for example, in a transparent mode. The combined image 153 may be referred to as a "fused image," a "combined image," and/or an "overlaid image."

The first image 151 passes through the first diffraction grating 141 and the waveguide 140 substantially unchanged. At the same time, the diffraction grating 141 redirects the rays from the second image 152 that have propagated down the waveguide to exit 140 in directions coincident to the first image 151. The eye of the viewer 180 performs a simple addition of the two images 151, 152 because the two images 151, 152 do not interfere with one another.

The magnification of the combined second optical device 120 and the collimation optics 130 is preferably the same as the magnification of the first optical device (typically ×1). This ensures that the images 151 and 152 appear to have substantially the same size as seen by the viewer 180.

The waveguide 140 may be thought of as the principal component of a waveguide assembly 140, 141, 142. When the gratings 141, 142 are coupled to the waveguide 140, for example, glued on with optical cement, among other possible means, they change the direction of incoming light by putting most of the energy into a desired diffraction order. Typically, the same diffraction grating may be used for both gratings 141, 142 in the same orientation so that the direction of the incoming and outgoing light is the same and the resulting image may be thought of as being coupled.

The first optical device 110 may be coupled to the waveguide 140 and/or the first diffraction grating 141, for example, via a mechanism such as a clamping mechanism, a threaded coupler, or any other type of coupling means that provides mechanical alignment and structural robustness. The second optical device 130 may similarly be mechanically coupled to the collimation optics 130 so that the second image 152 is correctly aligned with respect to the waveguide 140. In alternative embodiments, the collimator 130 may be incorporated into the second optical device 120.

While FIG. 1 depicts the first diffraction grating 141 and the second diffraction grating 142 as both being on the first planar surface 145 of the waveguide 140, in alternative embodiments, the diffraction grating 141 and the second diffraction grating 142 may both be on the second planar surface 146. Similarly, as shown by FIG. 2B, the diffraction grating 141 and the second diffraction grating 142 may be positioned on opposite planar surfaces 145, 146 of the waveguide 140.

The first diffraction grating 141 and the second diffraction grating 142 may preferably both be of the same type, for example, both reflective diffraction gratings or both transmissive gratings. However, for some applications the first diffraction grating 141 and the second diffraction grating 142 may differ in type, for example, one being a reflective diffraction grating and the other being a transmissive grating.

As used herein, "diffraction grating" 141, 142, may refer to a volume hologram integrated with the waveguide 140 to perform a diffractive redirection of the light. The waveguide 140 may use other structures apart from diffraction gratings/holograms, for example, a mirror for input and beam splitter for output or prism structures, although these may be less desirable than diffraction gratings/holograms, which may generally be thinner.

Figure 2A:
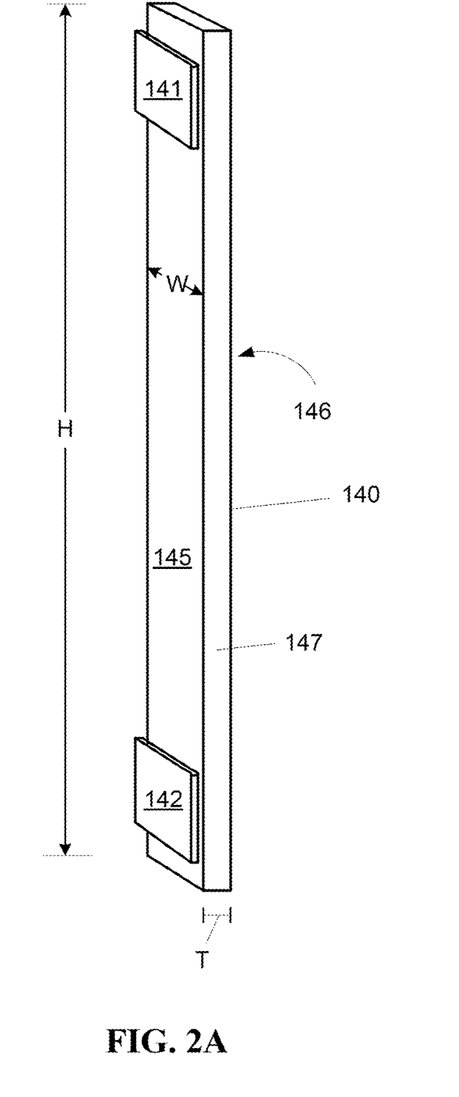
FIG. 2A is a schematic diagram showing a detailed view of the waveguide of FIG. 1.
Figure 2B:
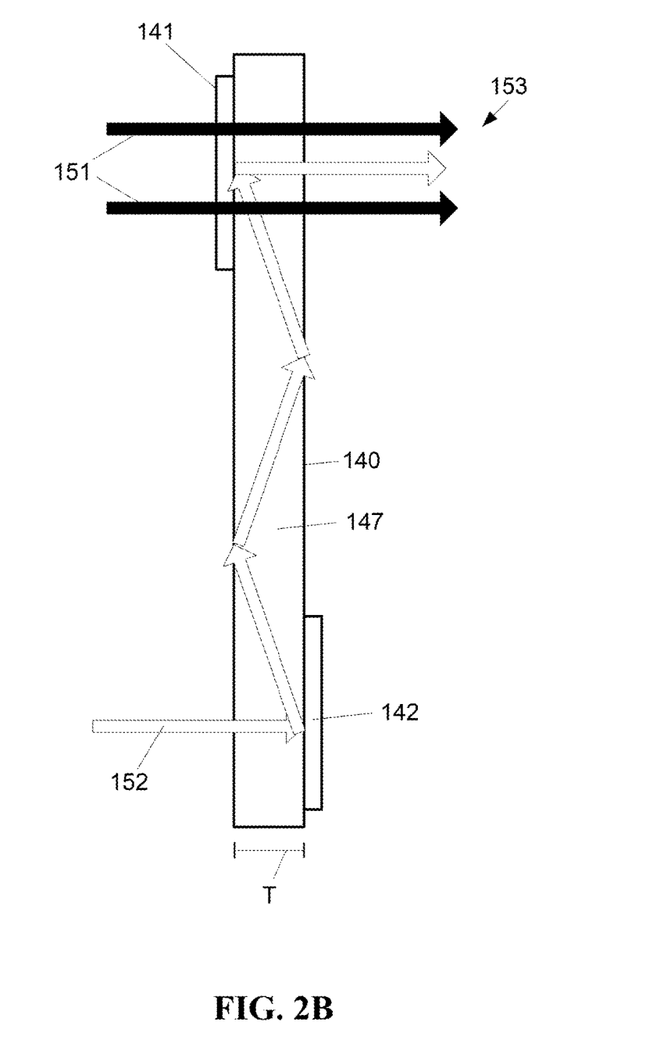
FIG. 2B is a schematic diagram showing a side view of a waveguide having gratings on opposite surfaces of the waveguide.

FIG. 2A is a detail of the waveguide 140. The waveguide 140 is preferably a planar waveguide or "slab" waveguide, having a substantially rectangular cross section. The first planar surface 145 and the second planar surface 146 may be substantially parallel over a height H (or length), the first planar surface 145 and the second planar surface 146 each having a width W, and being separated by a thickness T of the waveguide 140. In general, the width W of the waveguide 140 is greater than the thickness T of the waveguide. While FIGS. 1, 2A, and 2B depict the waveguide 140 as being generally planar, in alternative embodiments the waveguide 140 may have gently curved surfaces 145, 146. The diffraction gratings 141, 142 may be typically orientated the same way with respect to the direction of the periodic structure of the waveguide 140, but this may not always be the case.

FIG. 2B is a schematic diagram showing a side view of the waveguide 140 of FIG. 1. The waveguide 140 is configured according to the wavelengths of the first image 151 and the second image 152 so that all diffracted rays that propagate along the waveguide 140 satisfy the total internal reflection condition of the optical material of the waveguide 140. The waveguide 140 may have a field of view in the range of 20 degrees to 50 degrees, and be formed of a material having a low refractive index, for example NBK7 optical acrylic, or having a high refractive index, for example, N-SF11 depending upon the optical design and its application. An exemplary waveguide 140 may have a width in the range of 20-50 mm, a length (height) on the order of 30-100 mm, and a thickness in the range of 1-10 mm. The collimator 130 may have a diameter at a front end 132 that is approximately the same size as the eyepiece 115 of the first optical device 110 or a front lens of the first optical device, for example, a diameter of 20 mm, plus or minus 5 mm. The first image 151 and the second image 152 by construction preferably have the same magnification, for example, ×1 magnification. This ensures that the two images 151, 152 when aligned are overlaid with the same size.

As described above, combining the images 151, 152 at the waveguide 140 allows for the first image 151 and the second image 152 to have different and (preferably) contrasting color content, so that the viewer 180 can differentiate the first image 151 and the second image 152. In contrast, for example, combining images by injecting a digital thermal image into the objective lens of an $I^2$ device will result in a first image and second image both having a similar color content, for example, predominantly green.

Under the first embodiment 100, the collimator 130 and the waveguide 140 may be retrofitted to combine the first image 151 from an existing first optical device 110 and the second image 152 of an existing second optical device 120. For example, the collimator 130 and the waveguide 140 may be configured to clip onto the existing first optical device 110 and/or the second optical device 120.

The first optical system 110 and the second optical device 120 and collimator optics 124 and display 126 are arranged to produce the same magnification, for example ×1 magnification, so that the first image 151 and the second image 152 have the same size. The first image 151 and the second image 152 may be aligned, for example bore sighted, to overlay the second image 152 exactly on top of the first image 151. This may be achieved, for example, mechanically at manufacture time with in-house expertise and/or may be digitally realigned when in active use (for example due to drift with time and usage).

Figure 3:
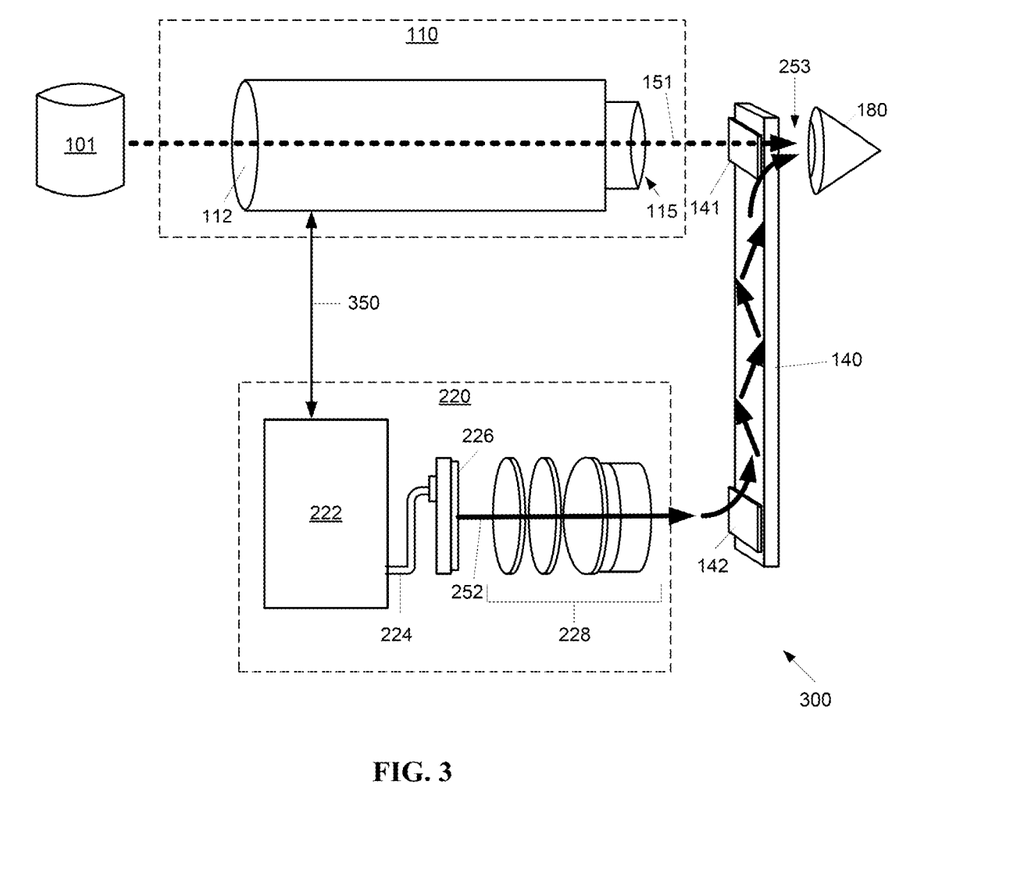
FIG. 3 is a schematic diagram of a second embodiment of an optical system according to the present invention.

FIG. 3 shows an exemplary second embodiment of the present invention directed to a system 300 for overlaying a generated image, for example, a digital image 252 with an image 151 produced by an optical device 110 to provide a combined image 253. For example, the first optical device 110 may be image intensified ($I^2$) night vision optics, or telescopic sight (day vision) optics. The overlaid digital image may include, for example, symbology (symbols that indicate one or more objects in a scene), or captions, among other types of digital images.

The second optical device 220 may include, for example, a digital display device 222 that produces the second image 252 to be overlaid with the scene 101. For example, the second optical device 120 may provide the second image 252 via an electrical connection 224 for viewing at a display 226. The display 226 may be an OLED (organic light emitting diode) display, preferably configured to provide a full range of colors in the visible spectrum, or, alternatively, may be configured to provide colors that contrast the color spectrum of the first image 151, which may be, for example a green phosphor typical of an image intensified channel. For example, if the color content of the first image 151 is predominantly in the green, the digital imaging device 222 may be configured to generate the second image 252 in the visible as red, green, and blue or combinations thereof (for example to produce grayscale images).

As with the first embodiment 100, under the second embodiment 300 the second image 152 presented by the display 226 may be collimated, for example, by a collimator 228 for introduction into the waveguide 140 through a second diffraction grating 142 on a first planar surface 145 of the waveguide 140. The first diffraction grating 141 and the second diffraction grating 142 may be coupled via the waveguide 140 such that the second image 252 may be conveyed via total internal reflection in the waveguide 140 to be viewable through the waveguide 140 by the viewer 180, for example, at the second planar surface 146 of the waveguide opposite the first planar surface 145, behind the first diffraction grating 141, such that the second image 252 overlays the first image 151 from the perspective of the viewer 180 at the combined image 253.

Under the second embodiment, the digital imaging device 222 may position symbols and/or captions of the second image 252 appropriately with respect to the first image 151 when they are overlaid by the waveguide 140. Similarly, in alternative embodiments of the first embodiment, there may be a connection 350, for example, a mechanical, electrical, or electromechanical connection between the second optical device 220 and the first optical device 110, for example, to provide alignment control between the first image 151 and the second image 152 (bore sighting).

Under the second embodiment 300, the second optical device 220 (including the collimation optics 228) and the waveguide 140 may be retrofitted to combine the first image 151 from an existing first optical device 110 and the second image 252 of the second optical device 220. For example, the second optical device 220 and the waveguide 140 may be configured to clip onto the existing first optical device 110.

Figure 4:
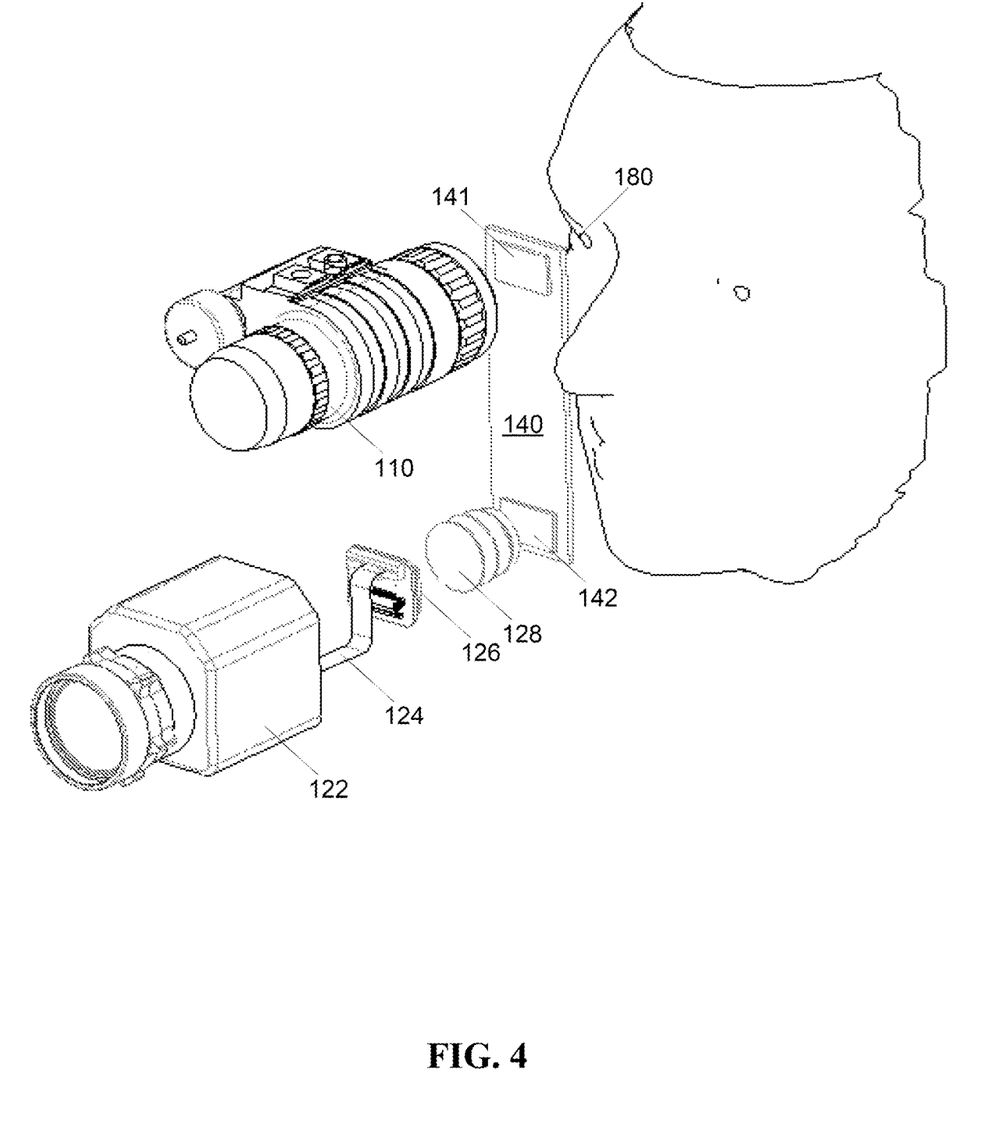
FIG. 4 shows a perspective view of the first embodiment of FIG. 1.

FIG. 4 shows a perspective view of the first embodiment. It should be noted that while FIG. 4 shows a bare waveguide 140 for clarity, in a typical application the waveguide 140 may be encapsulated appropriately (not shown) to provide a level of ruggedization.

Figure 5:
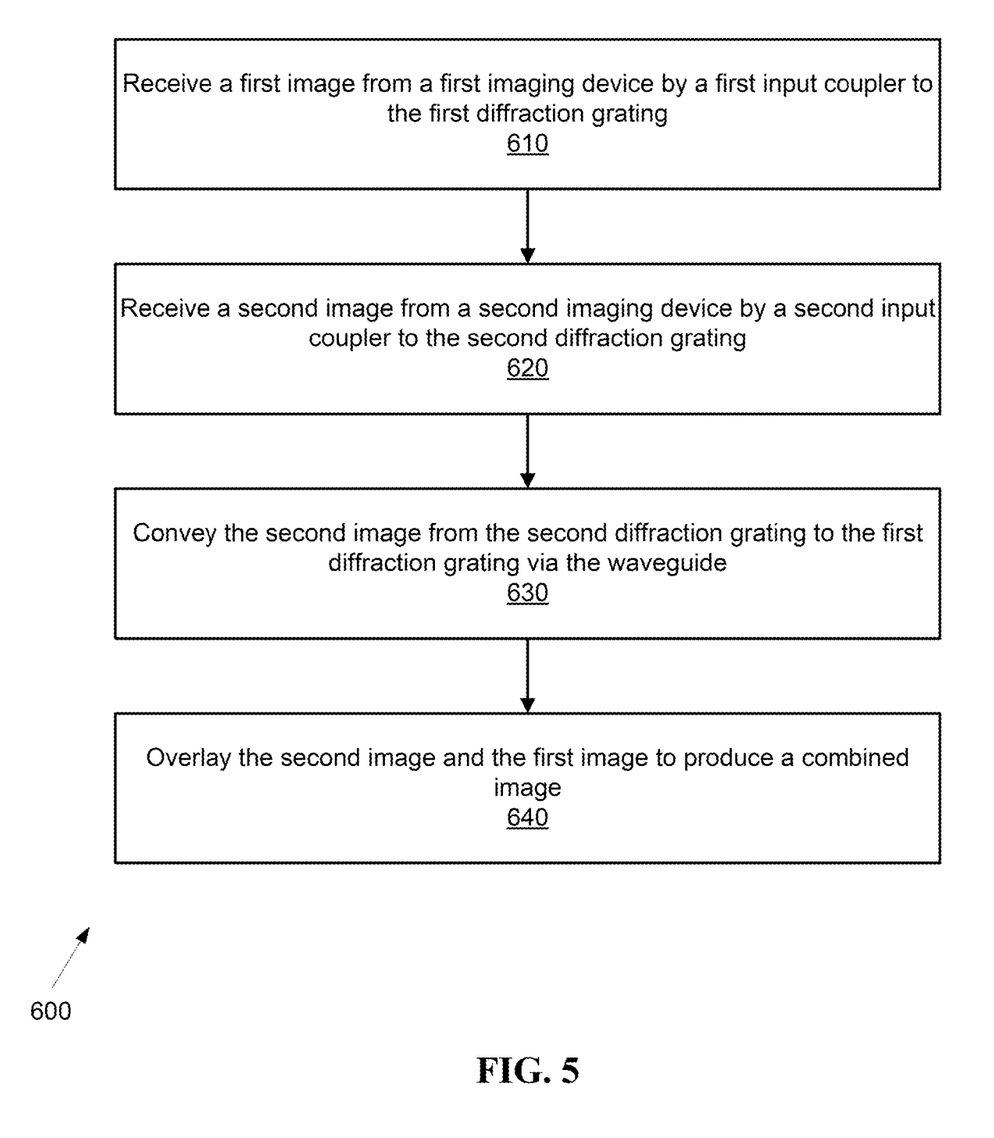
FIG. 5 is a flowchart of an exemplary embodiment of a method for combining a first image and a second image with a planar waveguide.

FIG. 5 is a flowchart 600 (described here with reference to the first embodiment shown in FIG. 1) of an exemplary embodiment of a method for combining a first image 151 and a second image 152 with a planar waveguide 140 comprising a first coupler to a first diffraction grating 141 in optical communication with the waveguide 140 and a second coupler to a second diffraction grating 142 in optical communication with the waveguide 140.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A first image 151 is received from a first imaging device 110 by a first input coupler to the first diffraction grating 141, as shown by block 610. A second image 152 is received from a second imaging device 120 by a second input coupler to the second diffraction grating 142, as shown by block 620. The second image 152 is conveyed from the second diffraction grating 142 to the first diffraction grating 141 via the waveguide 140, as shown by block 630. The second image 152 and the first image 151 exit the waveguide to produce a combined image 153, as shown by block 640.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical system for overlaying a first image of a scene and a second image, comprising:
   a first imaging device providing the first image, the first imaging device comprising an analogue optical device selected from the group consisting of an image intensified night vision device, and telescopic optics;
   a second imaging device comprising an image display and collimation optics providing the second image; and
   a waveguide, optically downstream from the image display, comprising:
      a first diffraction grating configured to receive the first image;
      a second diffraction grating configured to receive the second image; and
      a guide portion disposed between the first diffraction grating and the second diffraction grating configured to convey the second image to the first grating,
   wherein the first diffraction grating is configured to overlay the first image and the second image.

2. The system of claim 1 wherein the first diffraction grating is configured to overlay the first image and the second image in an effectively transparent mode.

3. The system of claim 1 wherein the first diffraction grating comprises an input coupler to the waveguide and the second diffraction grating comprises an output coupler from the waveguide.

4. The system of claim 3 wherein the first grating and/or the second grating comprises a reflective diffraction grating and/or a transmissive diffraction grating.

5. The system of claim 1, wherein the first image predominantly comprises a first color and the second image predominantly comprises colors other than the first color.

6. The system of claim 1 wherein the waveguide comprises a planar waveguide.

7. The system of claim 6 wherein the waveguide comprises a rigid structure.

8. The system of claim 1 wherein the second imaging device is selected from the group consisting of a thermal camera, a digital display device, and a symbology device.

9. The system of claim 8, wherein the second imaging device and the collimation optics operate at one times magnification.

10. The system of claim 1, wherein the second image comprises a digital image.

11. The system of claim 10 wherein the second imaging device comprises a thermal camera.

* * * * *